United States Patent [19]
Hall et al.

[11] 3,985,214
[45] Oct. 12, 1976

[54] FAN CLUTCH DRIVE

[75] Inventors: John L. Hall; Gilbert A. Pataky, both of Elyria, Ohio

[73] Assignee: The Bendix Corporation, South Bend, Ind.

[22] Filed: Dec. 4, 1974

[21] Appl. No.: 529,412

[52] U.S. Cl. ............................ 192/91 A; 192/30 W; 192/65; 92/165 PR
[51] Int. Cl.² .......................................... F16D 25/08
[58] Field of Search ................. 192/82 T, 91 A, 65, 192/30 W

[56] References Cited
UNITED STATES PATENTS

| | | | |
|---|---|---|---|
| 2,637,308 | 5/1953 | Dodge | 192/82 T |
| 2,661,148 | 12/1953 | Englander | 192/82 T |
| 2,840,316 | 6/1958 | Herbenar | 192/82 T |
| 2,877,751 | 3/1959 | Johnston | 192/82 T |
| 3,103,308 | 9/1963 | Wolfram | 192/82 T |
| 3,684,069 | 8/1972 | Pray | 192/85 CA |
| 3,684,397 | 8/1972 | Elmer | 192/91 A |
| 3,777,866 | 12/1973 | Elmer | 192/91 A |

*Primary Examiner*—Benjamin W. Wyche
*Attorney, Agent, or Firm*—Ken C. Decker; William N. Antonis

[57] ABSTRACT

A clutched fan drive for a vehicle engine is disclosed which couples the engine cooling fan to a member driven by the vehicle engine when the engine coolant temperature exceeds a predetermined level, and which uncouples the fan when the engine temperature level falls below the predetermined level. The fan drive includes a driving member which is rotatably mounted on a fixed spindle, a ram piston which is slidably mounted on the spindle, and a driven member which is rotatably mounted on the ram piston and which is movable therewith. The engine coolant fan is coupled to the driven member, and both the driven member and the driving member are provided with a clutching mechanism which is engaged by a resilient spring which acts against the ram piston. Consequently, the disclosed clutch fan drive requires no complicated and expensive load transmitting splines between the clutch elements and further requires no rotating pressure seals or complicated bearings which must accommodate both rotation and translatory movement.

5 Claims, 1 Drawing Figure

U.S. Patent  Oct. 12, 1976  3,985,214
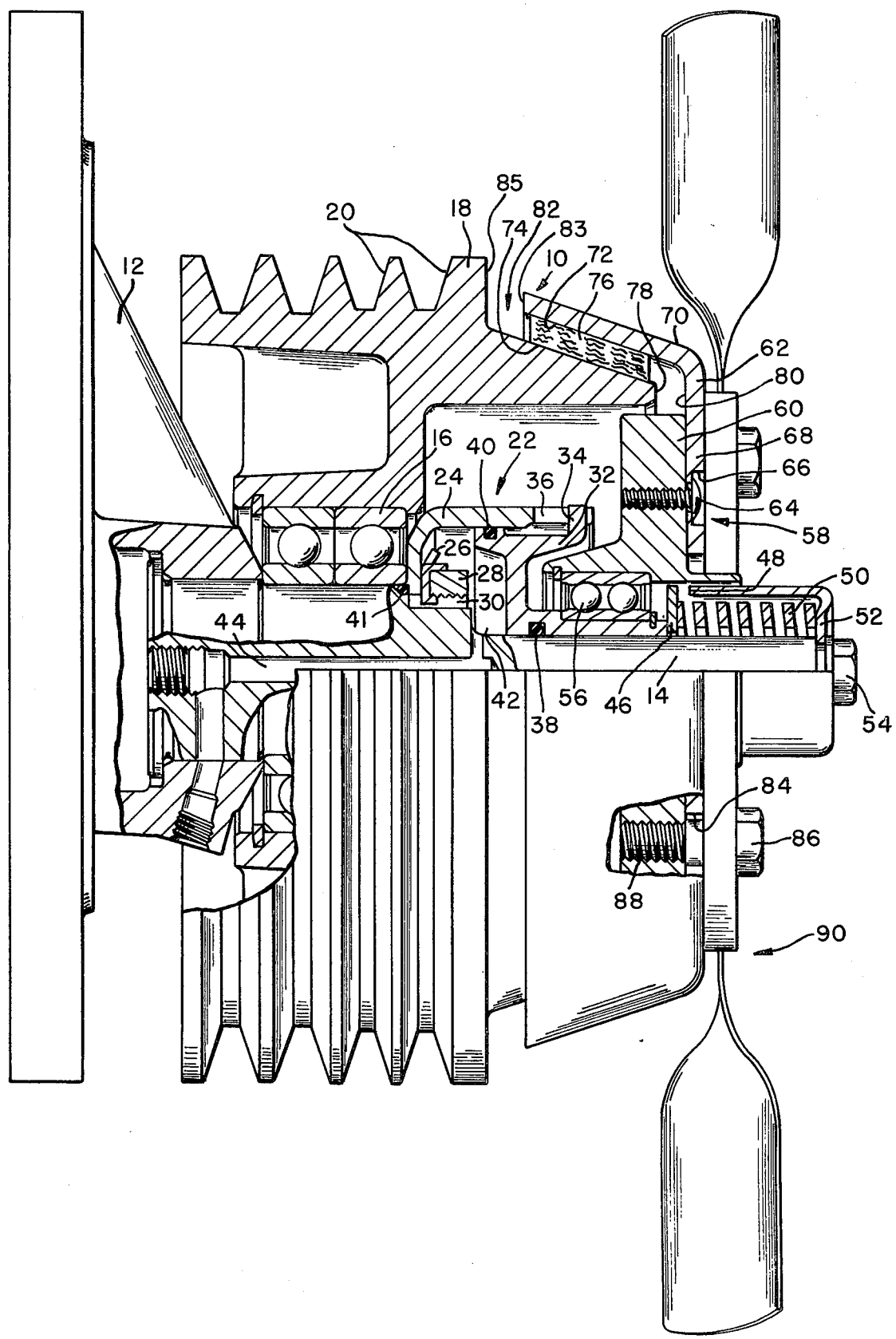

FAN CLUTCH DRIVE

BACKGROUND OF THE INVENTION

This invention relates to a clutch fan drive for a vehicle engine.

A typical vehicle internal combustion engine requires the cooling capability of the engine fan for only a relatively small percentage of the total engine operating time. However, in most engine installations the fan is rotated continuously whenever the vehicle engine is operated. Since a substantial percentage of the power generated by the vehicle engine must be used to rotate the engine coolant fan, and rotation of the engine fan significantly increases the noise level around the vehicle, it is desirable to provide a clutch fan drive which uncouples the engine fan during periods when the engine coolant temperature is relatively low and the fan is not needed, and which couples the fan to the fan drive mechanism when the coolant temperature increases to a temperature level which required the cooling capability of the engine fan. Although many clutched fan drive designs have been proposed, they have received only limited acceptance, because the size of the prior art clutch mechanism substantially restricts the number of engine installations on which the drive can be fitted, and also because prior art designs generally require complicated and expensive load transmitting splines in the clutch elements and further require relatively expensive and failure-prone rotating pressure seals. Although clutched fan drives may be used beneficially with any internal combustion engine, they are particularly valuable when used with engines used to power heavy duty trucks, since these types of trucks are typically used in applications where the fan may be disconnected for substantial periods of time, thereby achieving a significant fuel savings. Furthermore, heavy duty trucks of this type are normally equipped with an air brake system, which provides a source of fluid pressure which may be used to couple and uncouple the clutching mechanism.

SUMMARY OF THE INVENTION

Therefore, an important object of our invention is to provide a clutched fan drive for use with a vehicle engine which rotates the fan when the engine coolant temperature rises above a predetermined level and which uncouples the fan from the engine drive mechanism when the engine coolant temperature decreases to a temperature level which does not require the cooling power of the fan.

Still another object of our invention is to provide a clutched fan drive for the cooling fan of a vehicle engine which does not require rotating pressure seals.

Still another important object of our invention is to provide a clutched fan drive which does not require any expensive load transmitting splines in the clutching mechanism.

A further object of our invention is to design a fan clutch drive in which the clutch lining may be inspected visually to determine the degree of lining wear.

Still another important object of our invention is to design a clutched fan drive which does not require major disassembly of the device to replace worn-out lining.

A still further object of our invention is to design a clutched fan drive which is provided with integral stops to prevent damage to the clutch surfaces when the clutch lining is worn to a dangerously thin thickness.

A still further object of our invention is to provide a clutched fan drive which is "failsafe"; i.e., a fan drive in which the clutch is normally engaged to rotate the fan, but which is disengaged by fluid pressure, so that in case of failure of the fluid pressure, the clutch will be engaged.

BRIEF DESCRIPTION OF THE DRAWING the sole FIGURE in the drawing is a side elevation, partly in section, of a clutched fan drive made pursuant to the teachings of our present invention.

DETAILED DESCRIPTION

Referring now to the drawing, a clutched drive mechanism generally indicated by the numeral 10 includes a support bracket 12 which rigidly mounts a spindle 14 extending from the bracket 12. A bearing 16 mounts a driving member 18 for rotation about the spindle 14, but restrains the latter against axial movement with respect thereto. The driving member 18 is provided with conventional grooves 20 to accommodate a fan belt which is commonly used to interconnect the driving member or pulley 18 with the crank shaft of the vehicle engine. Fan drive 10 further includes a fluid pressure actuated ram generally indicated by the numeral 22. The ram 22 includes a stationery cylinder 24 which is locked against axial movement along the spindle 14 and against rotation relative thereto by a lock washer 26 and nut 28 which is screwed on threads 30 provided on the spindle 14. Ram mechanism 22 further includes a piston 32 which is mounted for axial movement along the spindle 14, but which is restrained against rotation thereabout by the engagement of a detent 34 extending from the piston 32 with a longitudinally extending slot 36 provided in the cylinder 24. Appropriate sliding fluid pressure seals 38, 40 are provided between the piston 32 and the spindle 14 and between the piston 32 and the cylinder 24, respectively. A static pressure seal 41 is provided between cylinder 24 and spindle 14. Consequently, a fluid receiving cavity 42 is defined between the spindle 14, the piston 32, and the cylinder 24. A passage 44 is provided to communicate fluid pressure into the cavity 42 from an appropriate fluid pressure source, such as the air brake system of the vehicle. Communication through the passage 44 is controlled by a temperature responsive valve (not shown) which is designed to vent the cavity 42 to atmosphere when the engine coolant temperature rises above a predetermined level, and which communicates the cavity 42 with the air pressure in the vehicle braking system when the coolant temperature drops below the predetermined temperature level. A valve which may be used for this purpose is disclosed in U.S. Pat. No. 3,738,571. Axial movement of the piston 32 along the spindle 14 to the right viewing the FIGURE is limited by engagement of an abutment 46 carried by the piston 32 with an abutment portion 48 of stop 52 which is attached to spindle 14 by bolt 54. A spring 50 is disposed between stop 52 on the spindle 14 and abutment 46 on the piston 32 for urging the latter to the left viewing the FIGURE.

A second bearing 56 mounts a driven member generally indicated by the numeral 58 for rotation about the piston 32 and for axial movement with the piston 32 relative to the spindle 14. The driven member 58 includes a support 60 and a pressure plate 62 which is coupled to the support 60 by screws 64 extending through apertures 66 provided in the pressure plate 62. The diameter of the aperture 66 is larger than the head of the screws 64 to provide a lost motion connection therebetween to permit limited radial movement of the pressure plate 62 relative to the support 60 so that the clutch surfaces carried by the pressure plate 62 are made self centering with respect to the clutch surface carried on the driving member 18.

The pressure plate 62 includes a radially extending portion 68 which engages the support 60 and another portion 70 which extends from the radially extending portion 68 and which defines a tapered clutch surface 72 on the inner circumferential surface thereof. The tapered clutch surface 72 extends generally parallel to a corresponding conical clutch surface 74 which is provided on the right hand portion of the driven member 18. However, each diameter of the tapered surface 72 is proportionally larger than the corresponding diameter of the conical surface 74, so that an annular cavity is defined therebetween which receives a clutch lining 76 carried by the clutch surface 72. Of course, as the lining 76 wears, the width of the aforementioned annular cavity between the surfaces 72 and 74 gradually decreases. Of course, when the lining 76 is completely worn away, the surfaces 72 and 74 could contact one another, which would damage the clutch surfaces. However, this contact is avoided because the right hand end of the conical surface 74 terminates in an abutment 78 which is adapted to engage a corresponding abutting surface 80 on the pressure plate 62 when the lining 76 is worn to a dangerously thin level. The abutments 78 and 80 engage one another while there is still a relatively small distance between the surfaces 72 and 74 to prevent this aforementioned dangerous engagement between these surfaces. Of course, the lining 76 is maintained in engagement with the conical surface 74 while the clutch mechanism 10 is engaged by the spring 50 described hereinabove. It will also be noted that the gap 82 defined between the end 83 of the portion 70 and the surface 85 on member 82 will decrease as the lining 76 wears. Therefore, the remaining lining can be determined at any time during the life thereof by measuring the gap 82. The pressure plate 62 is further provided with additional apertures 84 which accommodate bolts 86 which screw into threaded openings 88 in the support member 60 and which retain the engine cooling fan generally indicated by the numeral 90 for rotation with the driven member 58.

MODE OF OPERATION

The various components of the fan drive 10 are illustrated in the positions which they assume when the clutch is engaged to rotate the fan 90 and when the lining 76 is relatively new. In this condition, the spring 50 urges the piston 32 to the left, viewing the FIGURE, thereby also urging the driven member 58 to the left to maintain engagement of the friction lining 76 carried by the pressure plate 62 with the clutch surface 74 carried by the driving member 18. Consequently, rotation of the driving member 18 by the crankshaft of the vehicle engine by the V-belt connection will also rotate the fan 90. Rotation of the fan 90 pulls cooling air through the vehicle radiator in the normal manner, thereby reducing the temperature level of the engine coolant. When the temperature of the engine coolant is reduced to the predetermined level, the aforementioned valve (not shown) terminates communication between the chamber 42 and atmosphere and initiates communication between the chamber 42 and a source of high fluid pressure, such as the fluid pressure stored in the braking system of the vehicle. The fluid pressure in chamber 42 urges the piston 32 to the right, viewing the FIGURE, compressing the spring 50, and thereby urging the driven member 58 to the right. Movement of the member 58 to the right urges the friction lining 76 out of engagement with the clutch surface 74, thereby uncoupling the driven member from the driving member and thereby disconnecting the fan 90 from powered rotation by the engine of the vehicle. If the engine coolant temperature increases above the aforementioned temperature level, the aforementioned valve (not shown) terminates communication between the chamber 42 and the fluid pressure stored in the vehicle air braking system, and vents the chamber 42 to atmosphere. Consequently, the spring 50 will urge the piston 32, and therefore the driven member 58, to the left viewing the FIGURE, thereby causing the clutch lining 76 carried by the pressure plate 62 to again engage the conical clutch surface 74 to couple the driving member 18 and driven member 58 for rotation together, thereby initiating powered rotation of the fan 90.

As is the case in any clutching mechanism, after a relatively large number of engagements and disengagements, the clutch lining material 76 will wear, thereby increasing the stroke required of the piston 32 to engage the clutch mechanism 10 when powered rotation of the fan 90 is to be initiated. As pointed out hereinabove, the thickness of the lining 76 may be inspected during routine maintenance of the vehicle without disassembly of any part of the fan mechanism by measurement of the gap 82. When lining 76 is worn sufficiently thin as to require its replacement, bolts 86 are removed to dismount the fan 90, and thereafter the screws 64 are removed so that the pressure plate 62 may be removed from the support 60. The lining 76 is then replaced, and the pressure plate 62 is then reassembled to the support 60. Because of the lost motion connection between the heads of the screws 64 and the apertures 66, limited radial movement of the pressure plate 62 is permitted relative to the support 60 during reassembly of the pressure plate, so that the pressure plate is self centering with respect to the conical clutching surface 74 to thereby facilitate reassembly of the device.

We claim:

1. A clutched fan drive for a vehicle engine comprising a fixed spindle, a driving member, first bearing means rotatably mounting said driving member for rotation about said spindle, fluid pressure responsive ram means including means slidably mounted for axial movement on said spindle but restrained against rotation with respect thereto, a driven member, second bearing means rotatably mounting said driven member for rotation around said slidably mounted means but restraining said driven member for axial movement with said ram means, a rotatable fan carried by said driven member for movement therewith, resilient means yieldably urging said slidably mounted means in an axial direction on said spindle to urge said driven member means toward a position in which the latter is drivingly engaged with said driven member, and means for admitting fluid pressure to said ram means for urging the slidably mounted means against the opposition of said resilient means to drive said driven member out of driving engagement with said driving member, said driving member including a portion defining a first clutch surface, and a pressure plate carried by said driven member and including a radially extending portion and another portion extending from said radially extending portion, said another portion defining a second clutch surface, one of said surfaces carrying lining material for engagement with the other clutch surface when said members are drivingly engaged with one another, said first clutch surface terminating in an abutment surface, said pressure plate carrying a corresponding abutment surface, said abutment surfaces engaging one another after said lining material has worn to a predetermined thickness and said resilient means urges the driven member toward the position in which the driven member is drivingly engaged with the driven member, whereby damage to said clutch surfaces is prevented.

2. The invention of claim 1; and
releasable securing means releasably securing said pressure plate to said driven member, said releasable securing means including a lost motion connection between said pressure plate and said driven member to permit limited radial movement of the pressure plate with respect to said driven member.

3. The invention of claim 1:
said first clutch surface being a generally conical surface defined on the outer circumferential surface of said driving member, said another portion of said pressure plate having an inner circumferential surface extending generally parallel to said conical surface defining said second clutch surface, each diameter of said inner circumferential surface being larger than the corresponding diameter of said conical surface to define an annular cavity therebetween receiving said lining material.

4. The invention of claim 3:
said driving member carrying a reference surface cooperating with the end of said another portion of said pressure plate to define a gap therebetween, the length of said gap when the driving and driven members are engaged decreasing as the lining wears, whereby the amount of lining remaining at any time during the life thereof may be approximated by measuring the gap.

5. A clutched fan drive for a vehicle engine comprising a fixed spindle, a driving member, first bearing means rotatably mounting said driving member for rotation about said spindle, fluid pressure responsive ram means including means slidably mounted for axial movement on said spindle but restrained against rotation with respect thereto, a driven member, second bearing means rotatably mounting said driven member for rotation around said slidably mounted means but restraining said driven member for axial movement with said ram means, a rotatable fan carried by said driven member for movement therewith, resilient means yieldably urging said slidably mounted means in an axial direction on said spindle to urge said driven member toward a position in which the latter is drivingly engaged with said driven member, means for admitting fluid pressure to said ram means for urging the slidably mounted means against the opposition of said resilient means to drive said driven member out of driving engagement with said driving member, said ram means including a piston device, a cylinder device slidably receiving said piston device, and means preventing rotation of said piston device and cylinder device, said last-mentioned means including a locking mechanism comprising a slot extending parallel to the axis of the spindle in one of said devices slidably receiving a detent on the other device to thereby restrain rotation of said piston device relative to said cylinder device; and releasable securing means releasably securing a pressure plate to the driven member and including a lost motion connection between said pressure plate and said driven member to permit limited radial movement of the pressure plate with respect to said driven member.

* * * * *